US011367353B2

(12) United States Patent
Cho

(10) Patent No.: US 11,367,353 B2
(45) Date of Patent: Jun. 21, 2022

(54) APPARATUS FOR GUIDING ROUTE OF VEHICLE BASED ON MOBILE TERMINAL, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Dae Gil Cho, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 138 days.

(21) Appl. No.: 15/966,857

(22) Filed: Apr. 30, 2018

(65) Prior Publication Data

US 2019/0130744 A1    May 2, 2019

(30) Foreign Application Priority Data

Oct. 30, 2017 (KR) .................. 10-2017-0142493

(51) Int. Cl.
*G08G 1/0968* (2006.01)
*G01C 21/34* (2006.01)

(52) U.S. Cl.
CPC ....... *G08G 1/096883* (2013.01); *G01C 21/34* (2013.01); *G08G 1/096816* (2013.01); *G08G 1/096827* (2013.01)

(58) Field of Classification Search
CPC ....... G08G 1/096883; G08G 1/096816; G08G 1/096827; G01C 21/34
USPC ................................................. 701/412
See application file for complete search history.

(56) References Cited

U.S. PATENT DOCUMENTS

| 10,126,743 B2 | 11/2018 | Fukumoto |
| 10,365,118 B2 | 7/2019 | Kim |
| 2002/0040271 A1 | 4/2002 | Park et al. |
| 2004/0260458 A1 | 12/2004 | Park et al. |
| 2006/0106534 A1* | 5/2006 | Kawamata ......... G01C 21/3889 701/532 |
| 2006/0142933 A1 | 6/2006 | Feng |

(Continued)

FOREIGN PATENT DOCUMENTS

| CN | 1468423 A | 1/2004 |
| CN | 102663887 A | 9/2012 |

(Continued)

OTHER PUBLICATIONS

Office Action issued in corresponding Chinese Patent Application No. 2018105009227 dated Jul. 5, 2021, with English translation.

(Continued)

*Primary Examiner* — Jonathan M Dager
*Assistant Examiner* — Jean W Charleston
(74) *Attorney, Agent, or Firm* — Morgan, Lewis & Bockius LLP

(57) ABSTRACT

A system for guiding a route of a vehicle includes a vehicle terminal, a mobile terminal, and a telematics multimedia system (TMS) server, and the vehicle terminal includes a first processor configured to synchronize route information discovered and generated by the mobile terminal, search for a route to a destination based on traffic information, and determine an optimum route by comparing the searched route and the route information discovered by and received from the mobile terminal.

20 Claims, 13 Drawing Sheets

(56) References Cited

U.S. PATENT DOCUMENTS

| | | | |
|---|---|---|---|
| 2010/0153004 A1* | 6/2010 | Natsume | G08G 1/096883 701/533 |
| 2012/0130638 A1* | 5/2012 | Uyama | G08G 1/096838 701/533 |
| 2014/0163877 A1* | 6/2014 | Kiyama | G01C 21/3697 701/533 |
| 2015/0039210 A1* | 2/2015 | Ahn | G08G 1/096827 701/117 |
| 2015/0278733 A1* | 10/2015 | Lakshmanan | G06Q 10/06312 705/7.22 |
| 2015/0350413 A1* | 12/2015 | Ma | H04M 1/7253 455/418 |
| 2016/0075293 A1* | 3/2016 | Chun | H04W 76/25 701/2 |
| 2016/0189435 A1* | 6/2016 | Beaurepaire | G06Q 30/0208 705/13 |
| 2016/0216125 A1* | 7/2016 | Ahn | G01C 21/3415 |
| 2016/0358467 A1* | 12/2016 | Jeong | G01C 21/3647 |
| 2017/0010118 A1* | 1/2017 | Hajj | H04W 4/02 |
| 2017/0010613 A1* | 1/2017 | Fukumoto | G01C 21/3492 |
| 2017/0045368 A1 | 2/2017 | Kim | |
| 2017/0106794 A1* | 4/2017 | Constantine | H04W 4/023 |
| 2017/0249582 A1* | 8/2017 | Mademann | G06Q 10/083 |
| 2017/0279957 A1* | 9/2017 | Abramson et al. | H04M 1/6075 |
| 2017/0284818 A1* | 10/2017 | Boss | H04W 4/08 |
| 2018/0017398 A1* | 1/2018 | Mcnew | G01C 21/3492 |
| 2018/0143029 A1* | 5/2018 | Nikulin | G01C 21/3697 |
| 2018/0165727 A1* | 6/2018 | Gaither | B60L 53/56 |
| 2018/0216958 A1* | 8/2018 | Park | G01C 21/3614 |

FOREIGN PATENT DOCUMENTS

| | | |
|---|---|---|
| CN | 103345837 A | 10/2013 |
| CN | 106441314 A | 2/2017 |
| CN | 106941395 A | 7/2017 |
| JP | H05-18773 A | 1/1993 |
| JP | 2002-318124 A | 10/2002 |
| JP | 2015-158467 A | 9/2015 |
| KR | 10-2016-0035333 A | 3/2016 |
| KR | 20160035333 A * | 3/2016 |
| KR | 10-2017-0020021 A | 2/2017 |
| KR | 10-2017-0046929 A | 5/2017 |

OTHER PUBLICATIONS

Notice of Allowance issued in corresponding Korean Patent Application No. 10-2017-0142493 dated Dec. 20, 2021, with English translation.

* cited by examiner

<LINK INFORMATION OF VEHICLE TERMINAL SYNTHESIZED AGAIN>

APPARATUS FOR GUIDING ROUTE OF VEHICLE BASED ON MOBILE TERMINAL, SYSTEM INCLUDING THE SAME, AND METHOD THEREOF

CROSS-REFERENCE TO RELATED APPLICATION

This application is based on and claims the benefit of priority to Korean Patent Application No. 10-2017-0142493, filed on Oct. 30, 2017, with the Korean Intellectual Property Office, the entire disclosure of which is incorporated herein by reference.

TECHNICAL FIELD

The present disclosure relates to an apparatus for guiding a route of a vehicle based on a mobile terminal, a system including the same, and a method thereof, and more particularly, to a technology for sharing a route from a location of a vehicle discovered through a mobile terminal to a destination with a terminal of the vehicle.

BACKGROUND

In recent years, a map guide service applied to a vehicle is combined in a vehicle to provide a driver with a driving route, traffic and life information, and a game in real time.

The conventional map guide service is realized by installing an integral or a separable navigation terminal in the vehicle, and the navigation terminal generates a route as the driver directly inputs a destination through a touchscreen.

However, the navigation terminal installed in the vehicle has to be demounted from the vehicle for updating a program.

Accordingly, a technology for guiding a route through a navigation application of a mobile terminal that may be conveniently carried, by installing the navigation application in the mobile terminal is required.

However, because the technology requires a separate holder for holding the mobile terminal in the vehicle, a technology for combining a route found in the mobile terminal with a terminal of the vehicle is required.

SUMMARY

The present disclosure is conceived to solve the above-described problems of the related art, and the present disclosure provides an apparatus for guiding a route of a vehicle based on a mobile terminal, by which an optimum route may be guided to a driver by allowing a terminal of a vehicle to share a route discovered in advance by a mobile terminal as well as a destination, a system including the same, and a method thereof.

The technical objects of the present disclosure are not limited to the above-mentioned one, and the other unmentioned technical objects will become apparent to those skilled in the art from the following description.

In accordance with an aspect of the present disclosure, a system for guiding a route of a vehicle includes a vehicle terminal, a mobile terminal, and a telematics multimedia system (TMS) server, in which the vehicle terminal includes a first processor configured to synchronize route information discovered and generated by the mobile terminal, search for a route to a destination based on traffic information, and determine an optimum route by comparing the searched route and the route information discovered by and received from the mobile terminal.

The first processor may be further configured to regenerate route link information from a departure point to the destination based on GPS route information generated by the mobile terminal.

The vehicle terminal may further include a first communication device configured to receive the route information discovered and generated by the mobile terminal and the destination through communication with TMS server.

The TMS server may be configured to receive the route information discovered and generated by the mobile terminal and the destination, from the mobile terminal, and deliver the received route information and destination to the vehicle terminal.

The mobile terminal may include a second processor configured to determine location information thereof, search for a route to a destination input by a user while taking the determined location information or parking location information received from the TMS server as a departure point, and generate route link information by using the discovered route and generate GPS-based route information from the route link information, in which the mobile terminal further includes a second communication device configured to transmit the GPS-based route information to the TMS server.

The second processor of the mobile terminal may be further configured to select a route, a lead time of which is shorter, by comparing a lead time to the destination in the route information received from the mobile terminal and a lead time to the destination in the route information discovered by the first processor of the vehicle terminal.

The vehicle terminal may further include a controller configured to perform a control such that the route information received from the mobile terminal and the route information discovered by the first processor of the vehicle terminal are displayed on a display for a user's selection.

In accordance with another aspect of the present disclosure, an apparatus for guiding a route of a vehicle includes a processor configured to determine location information thereof, search for a route to a destination input by a user while taking the determined location information or parking location information received from a telematics multimedia system (TMS) server as a departure point, and generate route link information by using the discovered route and generate GPS-based route information from the route link information.

The processor may be further configured to search for a route by using traffic information received from a traffic information server.

The processor may be further configured to generate GPS information for respective first intervals in a route from the departure point to the destination, and the GPS-based route information may include the GPS information for the respective first intervals.

The processor may be further configured to generate GPS information for respective second intervals in a partial zone to generate final GPS-based route information, according to a form of a driving road on the GPS-based route information generated to include the GPS information for the respective first intervals.

The processor may be further configured to set the first intervals to become larger as a length of the route from the departure point to the destination becomes longer.

The form of the driving road may include at least one of a linear driving road, an entrance road, or a left and right turn route.

When the driving road includes one of a highway, a general road, and a narrow road on the GPS-based route information generated to include GPS information for the respective first intervals, the processor may set the second intervals to become smaller in sequence of the highway, the general road, and the narrow road.

When one of the entrance road or the left and right turn road is included on the GPS-based route information generated to include GPS information for respective first intervals, the processor may set the second intervals to be smaller than a specific interval.

The apparatus may further include a communication device configured to transmit the GPS-based route information to the TMS server.

In accordance with another aspect of the present disclosure, a method for guiding a route of a vehicle includes determining, by a processor, location information thereof, and searching for a route to a destination input by a user while taking the determined location information or parking location information received from a telematics multimedia system (TMS) server as a departure point, generating, by the processor, route link information by using the discovered route information and generate GPS-based route information from the route link information, and sharing, by the processor, the GPS-based route information and the destination with a vehicle terminal through the TMS server.

The generating of the GPS-based route information may include generating GPS information for respective first intervals in a route from the departure point to the destination, and the GPS-based route information may include the GPS information for the respective first intervals.

The method may further include generating, by the processor, GPS information for respective second intervals in a partial zone according to a form of a driving road on the GPS-based route information and generating final GPS-based route information.

The form of the driving road may include at least one of a linear driving road, an entrance road, or a left and right turn road, and the generating of the final GPS-based route information may include when the driving road include one of a highway, a general road, and a narrow road on the GPS-based route information generated to include GPS information for the respective first intervals, setting the second intervals to become smaller in sequence of the highway, the general road, and the narrow road.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
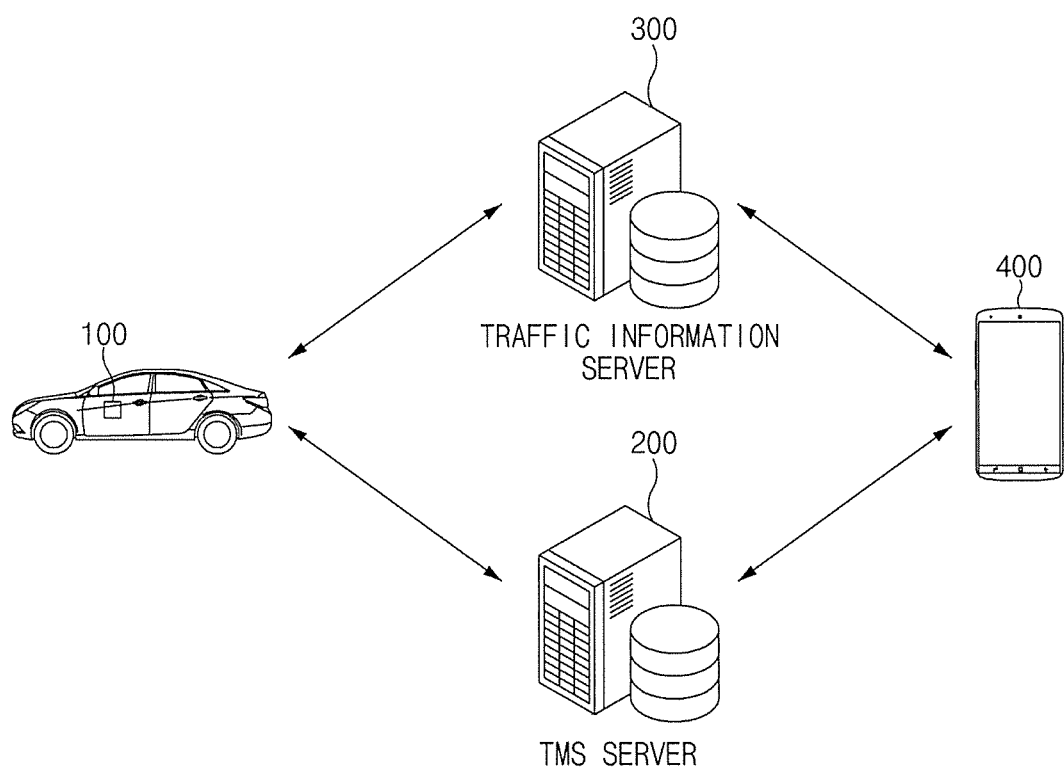
FIG. 1 is a diagram of a system for guiding a route of a vehicle based on a mobile terminal according to an embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

The present disclosure discloses a technology of guiding an optimum route to the driver by receiving a route discovered by a mobile terminal in advance as well as a destination from the mobile terminal by a vehicle terminal, thereby enhancing the convenience of the driver. To achieve this, a configuration of generating GPS-based route information based on GPS information to efficiently transmit route information generated by a mobile terminal to a vehicle terminal through a telematics multimedia system (TMS) server is disclosed. Further, in the present disclosure, a route includes route information from a departure point to a destination.

Hereinafter, exemplary embodiments of the present disclosure will be described in detail with reference to FIGS. 1 to 9.

Figure 2:
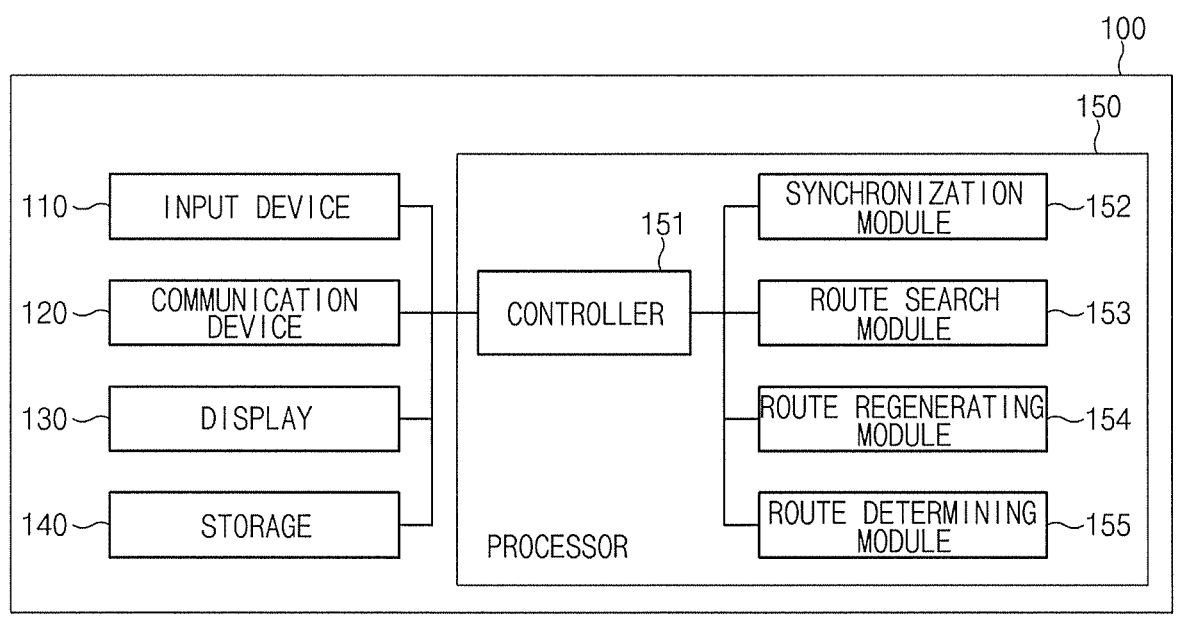
FIG. 2 is a block diagram of a terminal of a vehicle according to an embodiment of the present disclosure.
Figure 3:
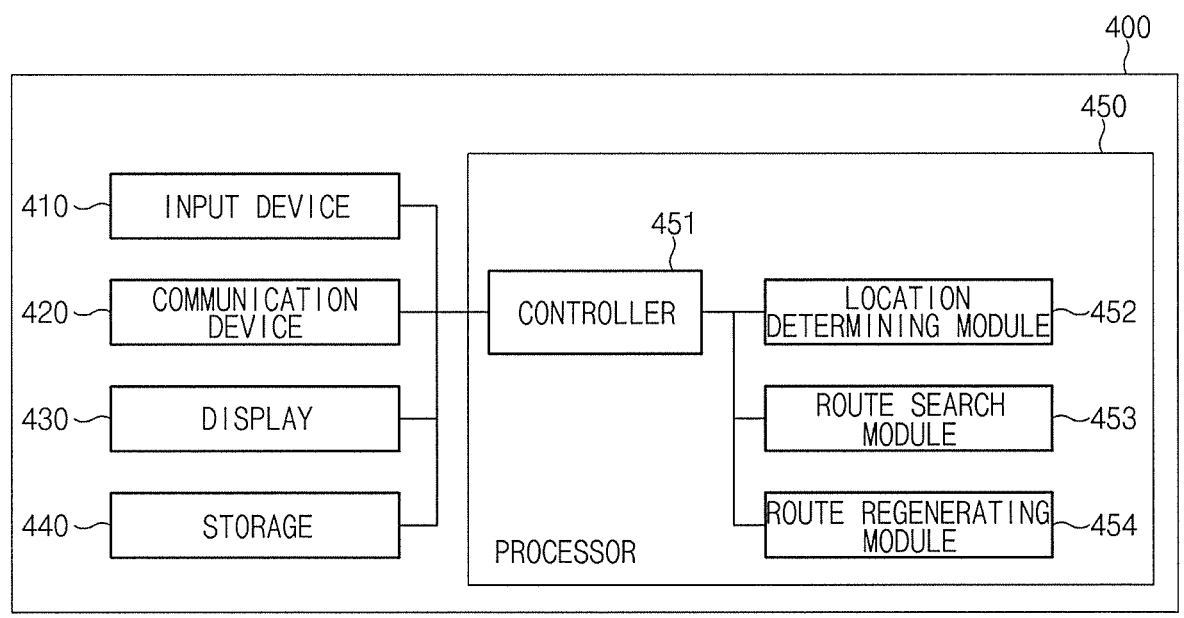
FIG. 3 is a block diagram of a mobile terminal according to an embodiment of the present disclosure.

FIG. 1 is a diagram of a system for guiding a route of a vehicle based on a mobile terminal according to an embodiment of the present disclosure. FIG. 2 is a block diagram of a terminal of a vehicle according to an embodiment of the present disclosure. FIG. 3 is a block diagram of a mobile terminal according to an embodiment of the present disclosure.

Referring to FIG. 1, the system for guiding a route of a vehicle based on a mobile terminal according to the embodiment of the present disclosure includes a vehicle terminal 100 mounted in a vehicle, a TMS server 200, a traffic information server 300, and a mobile terminal 400.

The vehicle terminal 100 may search for a route from a departure point to a destination, may reflect on traffic information received from the traffic information server 300 while searching for the route, and may share departure point or destination information with the TMS server 200. Further, the vehicle terminal 100 may recognize a location of the vehicle through a GPS receiver (not illustrated) or receive a parking location from the TMS server 200 to determine destination information, and may use destination information input directly by the user or destination information received through the TMS server 200. Then, the destination information received through the TMS server 200 may be information that is associated with the TMS server 200 by the mobile terminal 400. The vehicle terminal 100 may include a navigation device mounted in the vehicle, an audio, video, and navigation (AVN) system, and a telematics terminal.

Referring to FIG. 2, the vehicle terminal 100 includes an input device 110, a communication device 120, a display 130, a storage 140, and a processor 150.

A destination may be input from the user to the input device 110 or one of one or more routes may be selected through the input device 110. The input device 110 may be realized by a keypad, a dome switch, a touchpad (constant-pressure type/electrostatic), a jog wheel, a jog switch, or a touch panel.

The communication device 120 performs communication with the TMS server 200 and the traffic information server 300. To achieve this, the communication device 120 may include various communication units including a mobile communication unit, a broadcasting receiving unit, such as a DMB module or a DVB-H module, a short-range communication unit, a ZigBee module that is a Bluetooth module or an NEC module, and a Wi-Fie communication unit.

The display 130 displays a road guide screen by displaying the discovered route information or the route information received from the mobile terminal 400 on a screen to be regenerated. The display 130 may include at least one of a liquid crystal display (LCD), a thin film transistor (TFT) LCD, a light emitting diode (LED), an organic LED, an active matrix OLED (AMOLED), a flexible display, a bended display, and a 3D display. Among them, some displays may be realized by transparent displays that are configured in a transparent or light-transmitting way such that the outside is visible. Further, the display 130 may be provided as a touchscreen including a touch panel to be used as an input device as well as an output device.

The storage 140 stores the discovered route information or the route information received from the mobile terminal 400 on a screen to be regenerated. Then, the route information may include a lead time for reaching the destination. The storage 140 may include a memory, such as a flash memory type, a hard disk type, a micro type, or a card type (for example, a secure digital (SD) card or an eXtream digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The processor 150 searches for a route from a departure point to a destination, and determines an optimum route by comparing route information received from the mobile terminal 400. To achieve this, the processor 150 has an associated non-transitory memory storing software instructions which, when executed by the processor 150, provides the functionalities of a controller 151, a synchronization module 152, a route search module 153, a route regenerating module 154, and a route determining module 155. The processor 150 may take the form of one or more processor(s) and associated memory storing program instructions.

The controller 151 of the processor 150 performs a control to display route information received from the mobile terminal 400 and route information discovered by the route search module 153 such that the route information may be selected by the user. Further, the controller 151 controls overall operations of the elements, and may include an electronic control unit (ECU).

The synchronization module 152 of the processor 150 may synchronize the route information discovered and generated by the mobile terminal 400 and the destination. That is, the synchronization module 152 may apply the destination or the route information received from the mobile terminal to the vehicle terminal 100.

The route search module 153 of the processor 150 may search for a route based on the destination and the traffic information. Then, the route search module 153 may reflect the traffic information received from the traffic information server 300.

The route regenerating module 154 of the processor 150 may regenerate route link information from the departure point to the destination based on the GPS route information generated by the mobile terminal 400. Then, because the GPS route intonation generated by the mobile terminal 400 includes GPS information for respective intervals instead of entire information of the path from the departure point to the destination, the route regenerating module 154 regenerates route link information such that the link information is displayed, by using the GPS information and the map information.

The route determining module 155 of the processor 150 may determine an optimum route by comparing the route information discovered by the route search module 153 and the route information discovered by the mobile terminal 400 and received by the route determining module 155. That is, the route determining module 155 may determine a route, a lead time of which is shorter, as an optimum route by comparing a lead time to the destination in the route information received from the mobile terminal 400 and a lead time to the destination in the route information discovered by the route search module 153.

Referring to FIG. 1, the TMS server 200 stores and manages destination information registered in the vehicle terminal 100 or the mobile terminal 400, and stores parking location information of the vehicle through communication with the vehicle.

The traffic information server 300 collects traffic information from vehicles or road-side signal transmitting/receiving devices in real time and stores the traffic information, and provides real-time traffic information to the vehicle terminal 100 or the mobile terminal 400 when a request is made by the vehicle terminal 100 or the mobile terminal 400.

The mobile terminal 400 is a portable terminal of the user, and may be located inside or outside the vehicle and may search a route from a departure point to a destination inside or outside the vehicle. Then, the information on the departure point or the destination may be directly input by the user or the destination information shared by the vehicle terminal 100 through the TMS server 200 may be shared. Further, the mobile terminal 400 may receive traffic information from the traffic information server 300 during search for a route, and may search for a route while reflecting traffic information. Further, the mobile terminal 400 may search for a route after the user selects a departure location and a departure time. The GPS-based route information is generated from the discovered and generated route information, and final GPS-based route information is generated according to the form of the driving road and is provided to the vehicle terminal 100 through the TMS server 200.

The mobile terminal 400 may include a smartphone, a tablet personal computer (PC), a mobile phone, a video phone, an e-book reader, a netbook computer, a personal digital assistant (PDA), a portable multimedia player (PMP), a mobile communication terminal, and an electronic notebook, and may include all devices in which a navigation application may be installed. Further, a vehicle associated application that is associated with the vehicle display device 120 is installed in the mobile terminal 400. The vehicle associated application may be downloaded through wireless communication or the internet, and may be automatically installed after being downloaded.

Referring to FIG. 3, the mobile terminal 400 may include an input device 410, a communication device 420, a display 430, a storage 440, and a processor 450.

The input device 410 may receive a destination from the user.

The communication device 420 performs communication with the TMS server 200 and the traffic information server 300.

The display 430 may display the discovered route information.

The storage 440 may store the discovered route information.

The processor 450 shares the destination of the vehicle terminal 100 through the TMS server 200, or searches for a route to the destination by using the destination input by the user, generates GPS route information including GPS information in the discovered route, and shares the generated GPS route information with the vehicle terminal 100 through the TMS server 200.

To achieve this, the processor 450 has an associated non-transitory memory storing software instructions which, when executed by the processor 450, provides the functionalities of a controller 451, a location determining module 452, a route search module 453, and a route generating module 454. The processor 450 may take the form of one or more processor(s) and associated memory storing program instructions.

The controller 451 of the processor 450 controls overall operations of the elements.

The location determining module 452 of the processor 450 may determine location information thereof, and may receive location information from a GPS receiver (not illustrated) or a location sensor (not illustrated).

The route search module 453 of the processor 450 may search for a route to a destination input by the user while taking location information determined by the location determining module 452 or parking location information received from the TMS server 200, and may search for a route by applying traffic information received from the traffic information server 300.

Figure 4A:
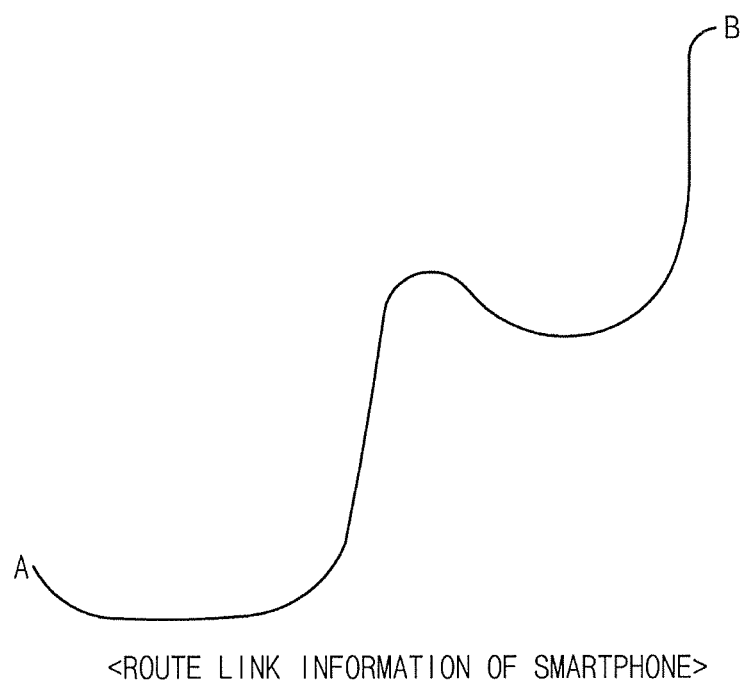
FIG. 4A is an exemplary view of route information generated by the mobile terminal according to an embodiment of the present disclosure.
Figure 4B:
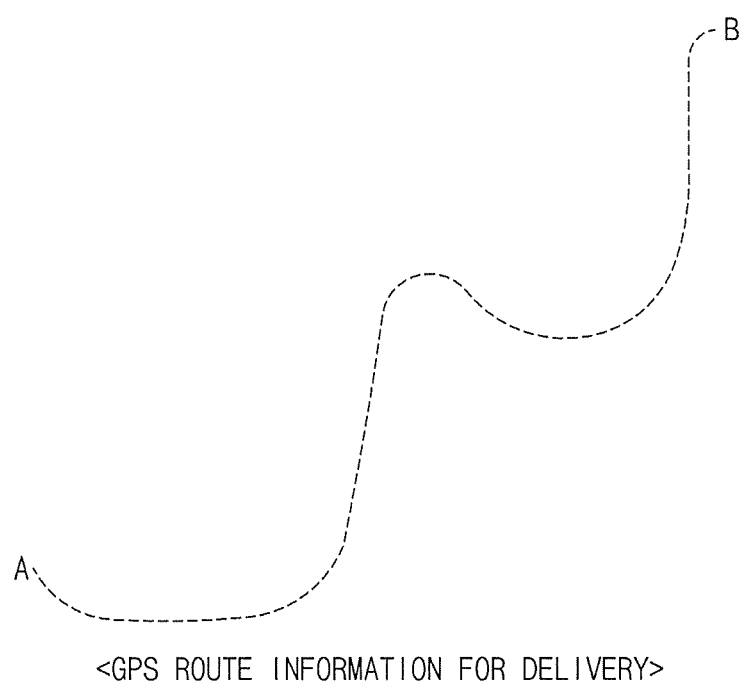
FIG. 4B is an exemplary view of GPS-based route information obtained by converting the route information in the mobile terminal according to an embodiment of the present disclosure.
Figure 4C:
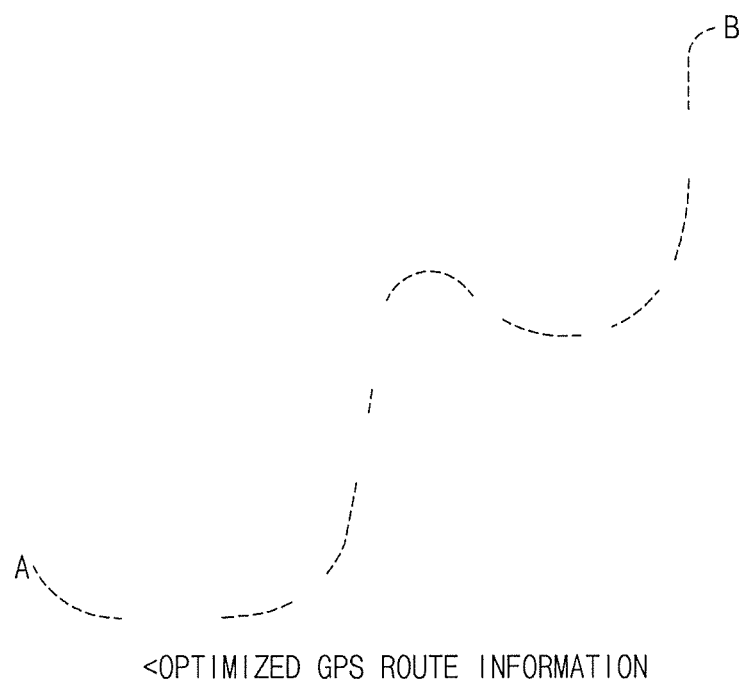
FIG. 4C is an exemplary view of GPS route information optimized by the mobile terminal according to an embodiment of the present disclosure.
Figure 4D:
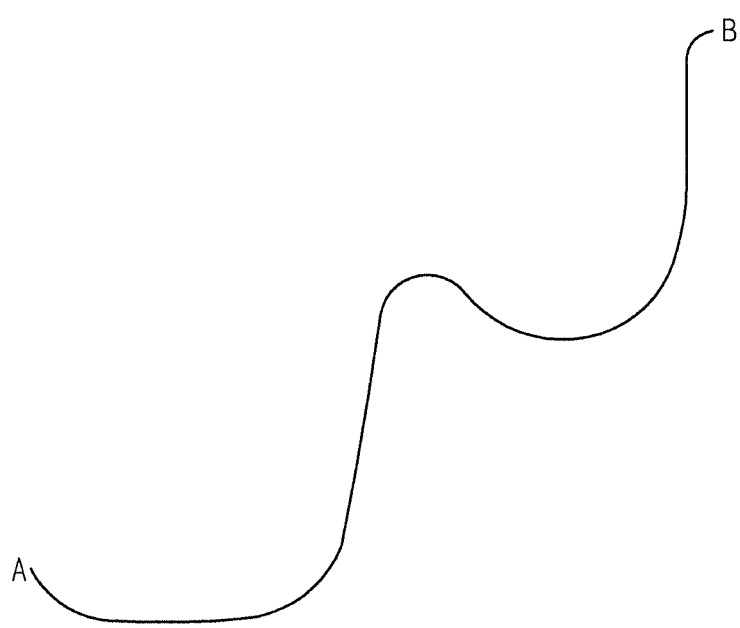
FIG. 4D is an exemplary view of route information resynthesized by the terminal of the vehicle according to an embodiment of the present disclosure.

The route generating module 454 of the processor 450 generates route link information by using the discovered route information, and generates GPS-based route information from the route link information. FIG. 4A is an exemplary view of route information generated by the mobile terminal according to an embodiment of the present disclosure. FIG. 4B is an exemplary view of GPS-based route information obtained by converting the route info motion in the mobile terminal according to an embodiment of the present disclosure. FIG. 4C is an exemplary view of GPS route information optimized by the mobile terminal according to an embodiment of the present disclosure. FIG. 4D is an exemplary view of route information resynthesized by the terminal of the vehicle according to an embodiment of the present disclosure.

Referring to FIG. 4A, the route link information generated by the route generating module 454 includes route information from a departure point to a destination, and referring to FIG. 4B, the GPS-based route information includes GPS information for respective intervals, of the route information from the departure point to the destination.

Further, the route generating module 454 may generate GPS information for respective first intervals in the route from the departure point to the destination, and the GPS-based route information may include GPS information for the respective first intervals. That is, the route generating module 454 may set the first interval to become larger as the length of the route from the departure point to the destination becomes longer. Referring to FIG. 4C, for example, when the total distance of the route from the departure point to the destination is 10 km or less, the GPS information may be extracted at an interval of 1 km and generate GPS route information. As the total distance of the route becomes longer, the interval of the GPS information becomes larger, and the interval may be 5 km when the total distance of the route is 50 km and the interval may be 10 km when the total distance of the route is 100 km when the GPS information is extracted to generate the GPS route information.

The route generating module 454 may generate GPS information for respective second intervals in a partial zone according to the form of the driving road on the GPS-based route information generated to include GPS information at the first interval to generate final GPS-based route information. Then, the farm of the driving road may include at least one of a linear driving road, an entrance road, or a left and right turn road.

When the driving road is a linear driving road, it may include a highway, a general road, and a narrow road, and the second interval may be set to become smaller in sequence of the highway, the general road, and the narrow road. For example, GPS-based route information including GPS information at a maximum interval of 100 km in the case of the highway, at a maximum interval of 80, 60, or 30 km in the case of the general road, and at a maximum interval of 10 km in the case of the narrow road. Then, the intervals may be different according to the maximum speeds of the roads.

When one of the entrance road or the left and right turn road is included on the GPS-based route information generated to include GPS information for respective first intervals, the route generating module 454 may set the second interval to be smaller than a specific interval. For example, the GPS-based route information may be generated to include GPS information for respective intervals of 1 km at two point before and after entrance of the vehicle into the highway, and to include GPS information for respective intervals of 1 km on a crossway of a general road or at points before and after the crossway.

The route generating module 454 may primarily generate GPS route information by extracting GPS information for respective specific intervals (first intervals) and secondarily generate GPS route information by extracting GPS information for respective specific intervals (second intervals) according to the form (a highway, a general road, a narrow road, an entrance road, or a crossway) of the route, thereby preventing a data transmission efficiency problem by sharing only minimum route information that is necessary to regenerate a route in the vehicle terminal 100, with the vehicle terminal 100.

As in FIG. 4D, the final GPS-based route information generated in this way may be regenerated by the vehicle terminal 100. That is, the vehicle terminal 100 may receive the final GPS-based route information as in FIG. 4C, and may include original route link information as in FIGS. 4A and 4D by using map information. In this way, when all route information is transmitted after the mobile terminal 400 generates GPS-based route information and shares the generated GPS-based route information with the vehicle terminal 100, data transmission efficiency may be prevented from being lowered.

In this way, according to the present disclosure, because the route information discovered by the mobile terminal 400 in advance may be shared with the vehicle terminal 100 and the vehicle terminal 100 compares the route information shared with the mobile terminal 400 and the route information discovered by the vehicle terminal 100, an optimum route may be provided to the driver.

Figure 5:
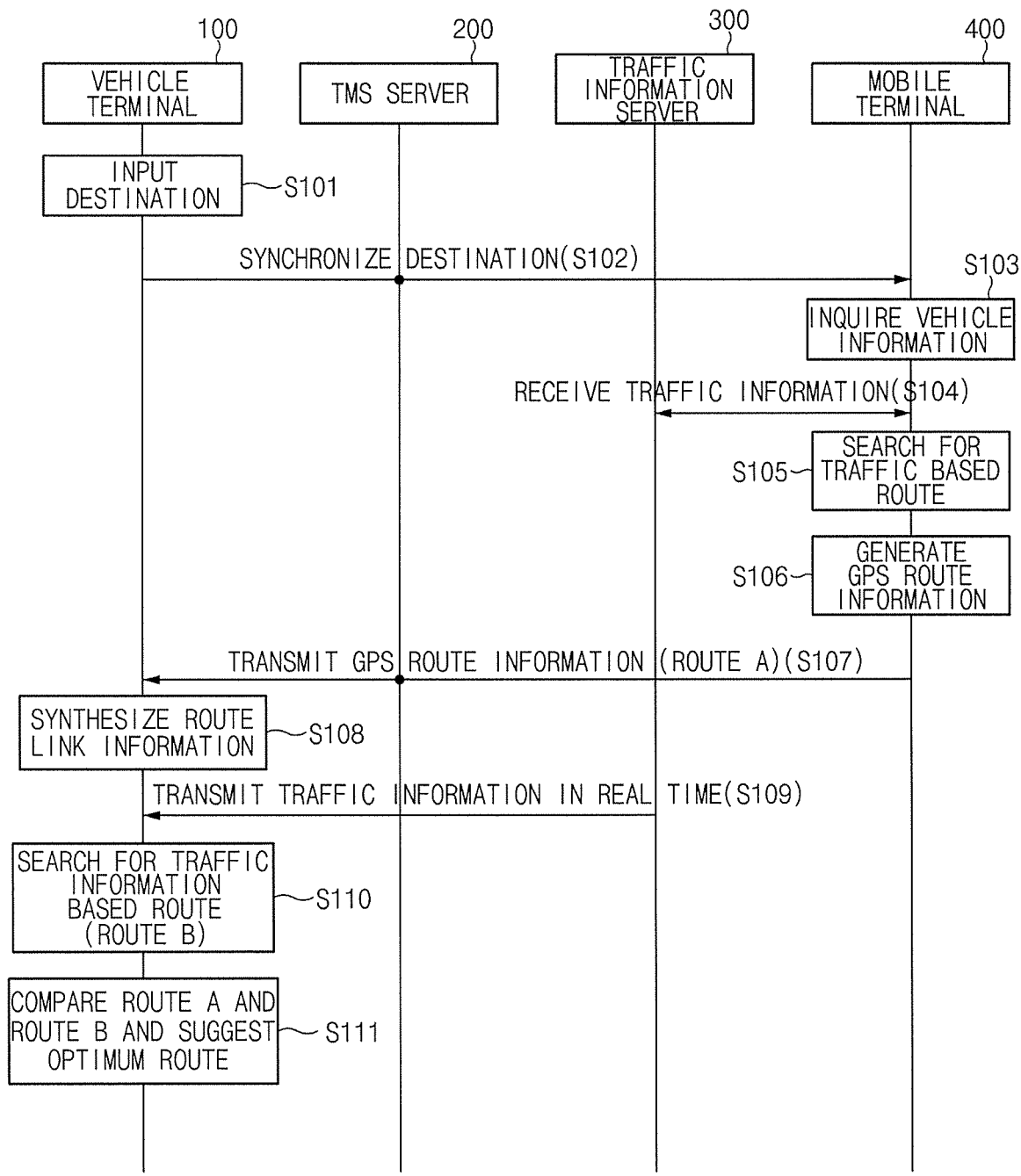
FIG. 5 is a flowchart illustrating a method for guiding a route of a vehicle based on a mobile terminal according to an embodiment of the present disclosure.

Hereinafter, a method for guiding a route of a vehicle based on a mobile terminal according to an embodiment of the present disclosure will be described in detail with reference to FIG. 5. FIG. 5 is a flowchart illustrating a method for guiding a route of a vehicle based on a mobile terminal according to an embodiment of the present disclosure.

Figure 6A:
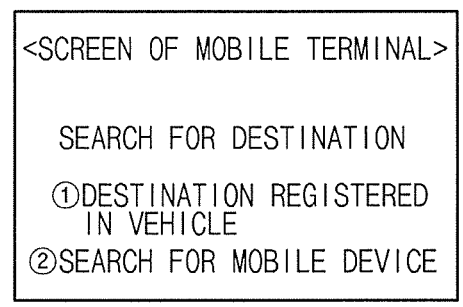
FIG. 6A is an exemplary view of a destination search screen of the mobile terminal according to an embodiment of the present disclosure.
Figure 6B:
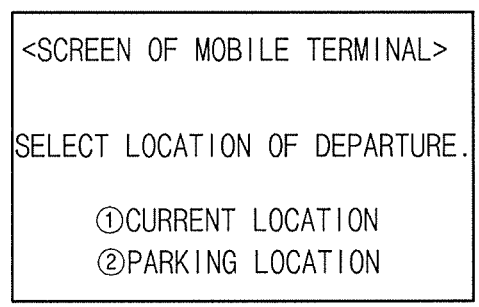
FIG. 6B is an exemplary view of a screen for selecting a start location in the mobile terminal according to an embodiment of the present disclosure.
Figure 7:
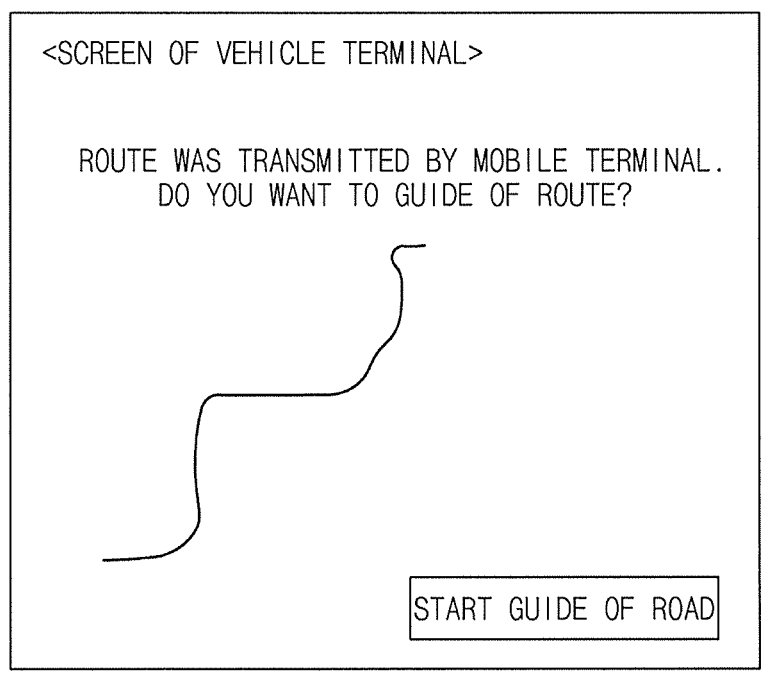
FIG. 7 is an exemplary view illustrating that a route guided by the mobile terminal is selected and displayed according to an embodiment of the present disclosure.
Figure 8:
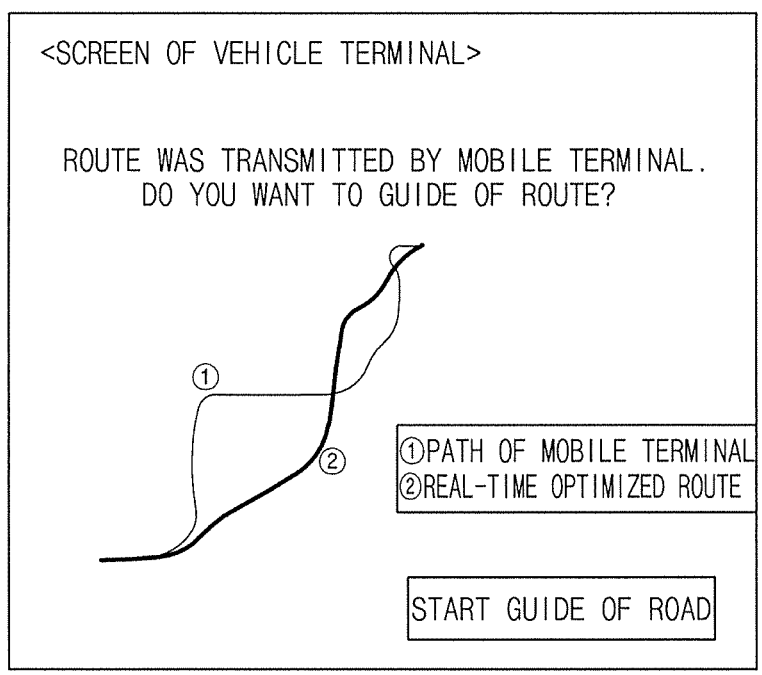
FIG. 8 is an exemplary view of displaying a route guided by the mobile terminal and a route discovered by the terminal of the vehicle on the terminal of the vehicle according to an embodiment of the present disclosure.

FIG. 6A is an exemplary view of a destination search screen of the mobile terminal according to an embodiment of the present disclosure. FIG. 6B is an exemplary view of a screen for selecting a start location in the mobile terminal according to an embodiment of the present disclosure. FIG. 7 is an exemplary view illustrating that a route guided by the mobile terminal according to an embodiment of the present disclosure. FIG. 8 is an exemplary view of displaying a route guided by the mobile terminal and a route discovered by the terminal of the vehicle on the terminal of the vehicle according to an embodiment of the present disclosure.

Referring to FIG. 5, if the vehicle terminal 100 receives a destination from the user (S101), the destination may be synchronized with the mobile terminal 400 through the TMS server 200 (S102). Then, the mobile terminal 400 may directly receive a destination from the user. In FIG. 6A, the mobile terminal 400 according to the embodiment of the present disclosure displays a screen for selecting whether the destination registered by the vehicle terminal 100 will be selected or the destination directly input from the user the mobile terminal 400 will be used. FIG. 6B is an exemplary view of a screen for selecting whether the mobile terminal 400 according to the embodiment of the present disclosure will select a current location of the mobile terminal 400 or a parking location received from the TMS server 200 will be selected as a departure location.

Subsequently, the mobile terminal 400 inquires vehicle information in which the corresponding destination is shared (S103), receives traffic information from the traffic information server 300 (S104), and searches for a traffic information based route by using the current location of the mobile terminal or the parting location of the vehicle received from the TMS server 200 (S105). Then, the traffic information based route is as in FIG. 4A.

Later, the mobile terminal 400 generates GPS-based route information from the discovered route information (S106), and transmits the GPS-based route information (route A) to the vehicle terminal 100 through the TMS server 200 (S107). Then, the GPS-based route information may be expressed as in FIG. 4B or FIG. 4C.

Accordingly, the vehicle terminal 100 synthesizes route link information again by using the GPS-based route information received from the mobile terminal 400 through the TMS server 200 (S108). Then, the vehicle terminal 100 may synthesize a route by using the GPS information and the map information of the GPS-based route information, and the route link information synthesized again is as in FIG. 4D. Then, the route link information of FIG. 4D that has been synchronized again is the same as the route link information generated by the mobile terminal 400.

Thereafter, the vehicle terminal 100 receives traffic information from the traffic information server 300 (S109) and searches for a route (route B) based on the traffic information (S110), and compares the route information (route A) shared with the mobile terminal 400 and the route information (route B) discovered by the vehicle terminal 100 and suggests an optimum route (S111). That is, a lead time of route A and a lead time of route B may be compared to determine a route a lead time of which is shorter as an optimum route.

FIG. 7 exemplifies a screen of the vehicle terminal in which a lead time of route A provided by the mobile terminal 400 is shorter than a lead time of route B and the vehicle terminal 100 asks whether the road will be guided via route A. FIG. 8 is an exemplary view of a screen for selecting route A or route B by the driver by displaying route B②densely as an optimum route and displaying route A together when the lead time of route A① is longer than the lead time of route B.

In this way, according to the present disclosure, because the route information discovered by the mobile terminal 400 in advance may be shared with the vehicle terminal 100 and the vehicle terminal 100 compares the route information shared with the mobile terminal 400 and the route information discovered by the vehicle terminal 100, an optimum route may be provided to the driver.

Figure 9:
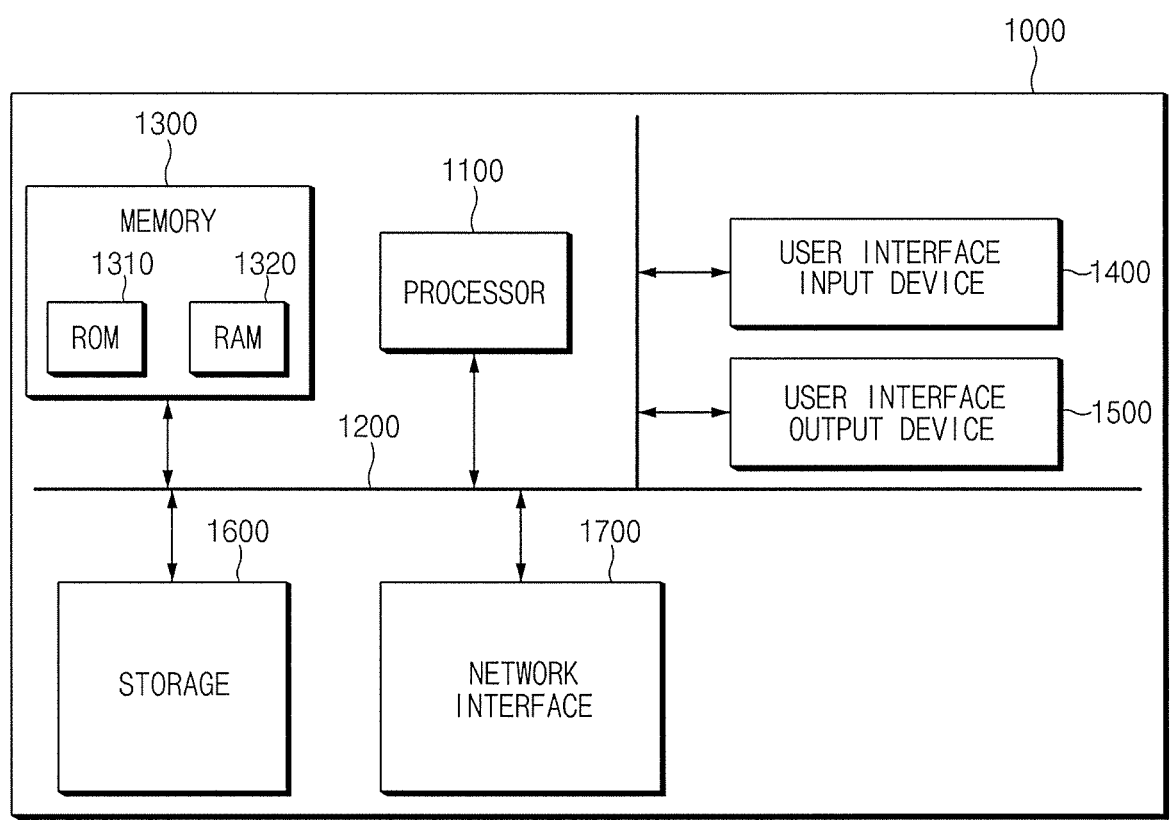
FIG. 9 is a block diagram of a computer system, to which the method for guiding a route of a vehicle according to an embodiment of the present disclosure is applied.

FIG. 9 is a block diagram of a computer system, to which the method for guiding a route of a vehicle according to an embodiment of the present disclosure is applied.

Referring to FIG. 9, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present disclosure may guide an optimum route to the driver by receiving a route discovered by a mobile terminal in advance as well as a destination from the mobile terminal by a vehicle terminal, thereby enhancing the convenience of the driver.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A system for guiding a route of a vehicle, the system comprising a vehicle terminal, a mobile terminal, and a telematics multimedia system (TMS) server, wherein the vehicle terminal is configured to:
   receive a first route to a destination from the mobile terminal of a user, the first route being discovered and generated by the mobile terminal;
   search for a second route to the destination based on traffic information;
   determine an optimum route by comparing the second route searched by the vehicle terminal to the first route received from the mobile terminal; and
   display the second route searched by the vehicle terminal and the first route received from the mobile terminal, and mark one of the first route and the second route as the optimum route,
   wherein the TMS server is configured to receive the first route discovered and generated by the mobile terminal and the destination, from the mobile terminal, and deliver the received first route and the destination to the vehicle terminal.

2. The system of claim 1, wherein the vehicle terminal is further configured to regenerate route link information from a departure point to the destination based on GPS route information generated by the mobile terminal.

3. The system of claim 2, wherein the vehicle terminal further includes:
   a first communication device configured to receive the first route discovered and generated by the mobile terminal and the destination through communication with the TMS server.

4. The system of claim 1, wherein the mobile terminal is configured to:
   determine location information thereof;
   search for a route to a destination input by the user while taking the determined location information or parking location information received from the TMS server as a departure point; and
   generate route link information by using the discovered route and generate GPS-based route information from the route link information,
   wherein the mobile terminal further includes a second communication device configured to transmit the GPS-based route information to the TMS server.

5. The system of claim 4, wherein the mobile terminal is further configured to select a route, a lead time of which is shorter, by comparing a lead time to the destination in the first route received from the mobile terminal and a lead time to the destination in the second route discovered by the vehicle terminal.

6. The system of claim 5, wherein the vehicle terminal further includes:
   a controller configured to perform a control such that the first route received from the mobile terminal and the second route searched by the vehicle terminal are displayed on a display for a user's selection.

7. The system of claim 1, wherein the mobile terminal is configured to:
   determine location information thereof;
   search for a route to a destination input by the user while taking the determined location information or parking location information received from the TMS server as a departure point; and
   generate route link information by using the discovered route and generate GPS-based route information from the route link information.

8. The system of claim 7, wherein the mobile terminal is further configured to search for a route by using traffic information received from the traffic information server.

9. The system of claim 7, wherein the mobile terminal is further configured to generate GPS information for respective first intervals in a route from the departure point to the destination, and
   wherein the GPS-based route information includes the GPS information for the respective first intervals.

10. The system of claim 9, wherein the mobile terminal is further configured to generate GPS information for respective second intervals in a partial zone to generate final GPS-based route information, according to a form of a driving road on the GPS-based route information generated to include the GPS information for the respective first intervals.

11. The system of claim 10, further comprising:
    a communication device configured to transmit the GPS based route information to the TMS server.

12. The system of claim 9, wherein the mobile terminal is further configured to set the first intervals to become larger as a length of the route from the departure point to the destination becomes longer.

13. The system of claim 9, wherein the form of the driving road includes at least one of a linear driving road, an entrance road, or a left and right turn route.

14. The system of claim 13, wherein when the driving road includes one of a highway, a general road, and a narrow road on the GPS-based route information generated to include GPS information for the respective first intervals, of the mobile terminal sets the second intervals to become smaller in sequence of the highway, the general road, and the narrow road.

15. The system of claim 13, wherein when one of the entrance road or the left and right turn road is included on the GPS-based route information generated to include GPS information for respective first intervals, the mobile terminal sets the second intervals to be smaller than a specific interval.

16. The system of claim 1, wherein the vehicle terminal is further configured to receive a destination inputted from the user, the destination being synchronized with the mobile terminal of the user through the TMS server.

17. A method for guiding a route of a vehicle, the method comprising:
   determining, by a mobile terminal of a user, location information thereof, while taking the determined location information or parking location information received from a telematics multimedia system (TMS) server as a departure point;
   generating, by the mobile terminal, route link information by using a discovered route information and generate GPS-based route information from the route link information;
   sharing, by the mobile terminal, the GPS-based route information and a destination with a vehicle terminal through the TMS server;
   receiving, by the vehicle terminal, a first route to the destination, the first route being discovered and generated by the mobile terminal;
   searching, by the vehicle terminal, for a second route to the destination based on traffic information;
   determining, by the vehicle terminal, an optimum route by comparing the second route searched by the vehicle terminal to the first route received from the mobile terminal; and
   displaying, by the vehicle terminal, the second route searched by the vehicle terminal and the first route received from the mobile terminal, and marking one of the first route and the second route as the optimum route,
   wherein the receiving of the first route to the destination includes
   receiving, by the TMS server, the first route discovered and generated by the mobile terminal and the destination, from the mobile terminal, and delivering, by the TMS server, the received first route and the destination to the vehicle terminal.

18. The method of claim 17, wherein the generating of the GPS-based route information includes:
   generating GPS information for respective first intervals in a route from the departure point to the destination, and
   wherein the GPS-based route information includes the GPS information for the respective first intervals.

19. The method of claim 18, further comprising:
   generating, by the mobile terminal, GPS information for respective second intervals in a partial zone according to a form of a driving road on the GPS-based route information and generating final GPS-based route information.

20. The method of claim 19, wherein the form of the entrance road, or a left and right turn road, and
   wherein the generating of the final GPS-based route information includes:
   when the driving road includes one of a highway, a general road, and a narrow road on the GPS-based route information generated to include GPS information for the respective first intervals, setting the second intervals to become smaller in sequence of the highway, the general road, and the narrow road.

* * * * *